United States Patent
Martin

(10) Patent No.: US 8,824,662 B2
(45) Date of Patent: *Sep. 2, 2014

(54) METHOD AND APPARATUS FOR INTERFACING A CUSTOMER WITH A CALL CENTER

(75) Inventor: Paul Martin, Calgary (CA)

(73) Assignee: Rockstar Consortium US LP, Plano, TX (US)

( * ) Notice: Subject to any disclaimer, the term of this patent is extended or adjusted under 35 U.S.C. 154(b) by 162 days.

This patent is subject to a terminal disclaimer.

(21) Appl. No.: 13/474,210

(22) Filed: May 17, 2012

(65) Prior Publication Data

US 2012/0288080 A1 Nov. 15, 2012

Related U.S. Application Data

(63) Continuation of application No. 13/252,595, filed on Oct. 4, 2011, which is a continuation of application No. 10/858,979, filed on Jun. 2, 2004, now Pat. No. 8,045,697.

(51) Int. Cl.
*H04M 3/00* (2006.01)
*H04M 5/00* (2006.01)
*G06Q 20/10* (2012.01)
*H04M 3/523* (2006.01)

(52) U.S. Cl.
CPC .............. *H04M 3/523* (2013.01); *G06Q 20/108* (2013.01); *H04M 2242/30* (2013.01); *H04M 2203/2094* (2013.01); *G06Q 20/10* (2013.01)
USPC ............ 379/265.13; 379/265.01; 379/265.02; 379/265.12; 379/266.01; 379/309

(58) Field of Classification Search
USPC ............. 379/265.01, 265.02, 265.12, 265.13, 379/266.01, 309
See application file for complete search history.

(56) References Cited

U.S. PATENT DOCUMENTS

| | | | |
|---|---|---|---|
| 5,822,418 A | 10/1998 | Yacenda et al. |
| 6,449,356 B1 | 9/2002 | Dezonno |
| 6,553,113 B1 | 4/2003 | Dhir et al. |
| 6,700,972 B1 | 3/2004 | McHugh et al. |
| 6,798,876 B1 | 9/2004 | Bala |
| 6,819,753 B1 | 11/2004 | Verkruijssen |
| 6,826,194 B1 | 11/2004 | Vered et al. |
| 6,832,203 B1 | 12/2004 | Villena et al. |

(Continued)

OTHER PUBLICATIONS

Laran RFID, "A Basic Introduction to RFID Technology and its Use in the Supply Chain," White Paper, Jan. 2004, 30 pages.

(Continued)

*Primary Examiner* — Quynh Nguyen
(74) *Attorney, Agent, or Firm* — Withrow & Terranova, PLLC

(57) ABSTRACT

A method for interfacing a customer with a call center. Information obtained from a Radio Frequency Identification (RFID) tag is transmitted to the call center to provide additional information about the customer and allow the session to be accurately routed within the call center. The call center may be accessed by telephone, computer, or other type of customer premises equipment over a voice or data network. The RFID tag may be an identification tag provided to the customer for access to the call center or may be a tag associated with the customer and not specific to the call center. The call center may route calls based on routing information contained in the RFID tag information, customer identity and previous sessions with that customer, personal and demographic information, and statistical support records for other sessions involving customers with similar personal and demographic information, and according to agent statistical support records.

4 Claims, 3 Drawing Sheets

(56) References Cited

U.S. PATENT DOCUMENTS

| | | | |
|---|---|---|---|
| 7,536,002 | B1 | 5/2009 | Ma et al. |
| 8,045,697 | B1 | 10/2011 | Martin |
| 2003/0035532 | A1 | 2/2003 | Ganesan et al. |
| 2004/0042610 | A1 | 3/2004 | Arashi |
| 2004/0125940 | A1 | 7/2004 | Turcan et al. |
| 2005/0193060 | A1 | 9/2005 | Barton |
| 2005/0242177 | A1 | 11/2005 | Roberge et al. |

OTHER PUBLICATIONS

Renshaw, T., "nTag-You're It," Financial Post, Feb. 2, 2004, 1 page.
Wallace, R., "Silicon, Not Just Software, Key to Pervasive Media," EE Times, Jan. 14, 2004, 4 pages.
Yoshida, J., "Philips, Visa Push Contactless Payments in Consumer Devices," EE Times, Jan. 12, 2004, 2 pages.
Notice of Allowance for U.S. Appl. No. 10/858,979 mailed Jun. 21, 2011, 5 pages.
Non-final Office Action for U.S. Appl. No. 10/858,979 mailed Mar. 2, 2011, 5 pages.
Panel Decision on Pre-Appeal Brief for U.S. Appl. No. 10/858,979 mailed Jan. 13, 2011, 2 pages.
Final Office Action for U.S. Appl. No. 10/858,979 mailed Jul. 16, 2010, 9 pages.
Non-final Office Action for U.S. Appl. No. 10/858,979 mailed Feb. 29, 2008, 13 pages.
Non-final Office Action for U.S. Appl. No. 13/252,595 mailed Sep. 21, 2012, 7 pages.
Non-final Office Action for U.S. Appl. No. 13/252,595 mailed Feb. 7, 2013, 7 pages.
Examiner's Answer for U.S. Appl. No. 13/252,595, mailed Dec. 18, 2013, 11 pages.
Final Office Action for U.S. Appl. No. 13/252,595, mailed Jun. 4, 2013, 10 pages.

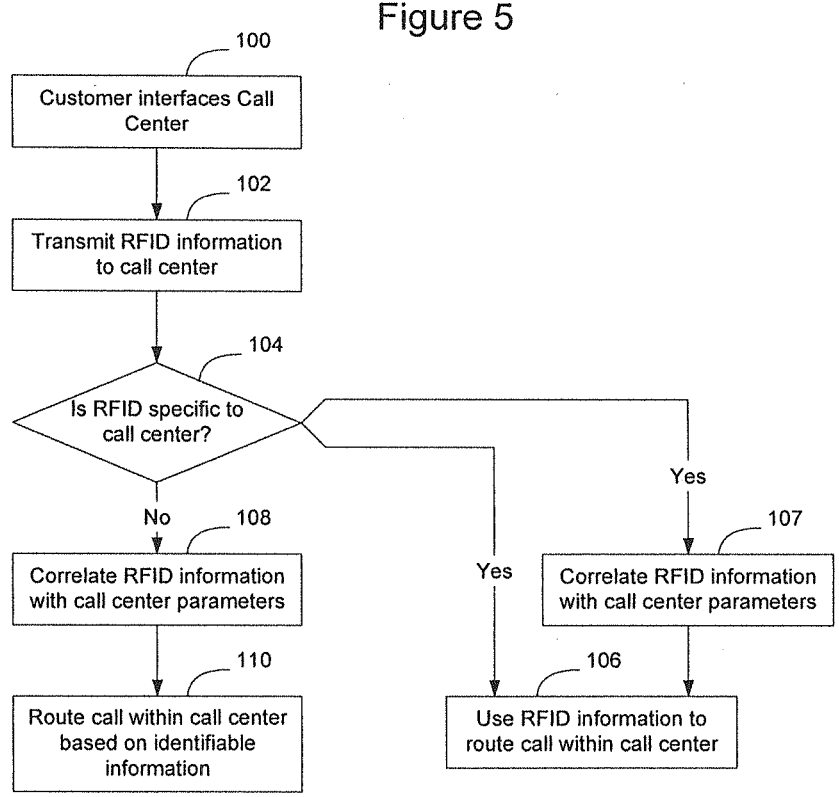

METHOD AND APPARATUS FOR INTERFACING A CUSTOMER WITH A CALL CENTER

RELATED APPLICATIONS

This application is a continuation of U.S. patent application Ser. No. 13/252,595, filed on Oct. 4, 2011, entitled METHOD AND APPARATUS FOR INTERFACING A CUSTOMER WITH A CALL CENTER, which is a continuation of U.S. patent application Ser. No. 10/858,979, filed on Jun. 2, 2004, entitled METHOD AND APPARATUS FOR INTERFACING A CUSTOMER WITH A CALL CENTER, now U.S. Pat. No. 8,045,697, each of which is hereby incorporated herein by reference in its entirety.

BACKGROUND OF THE DISCLOSURE

1. Field of the Disclosure

The present disclosure relates to communication networks and, more particularly, to a method and apparatus for interfacing a customer with a call center.

2. Description of the Related Art

Call centers are used in many instances to sell products or to provide support for previously sold products. In a typical call center, a customer will make a call and be prompted to enter information to enable that caller to be routed to an appropriate sale or support person, referred to herein as "agents." Examples of information that may be collected by the call center software include demographic information, personal information, intent information associated with the reason the person is calling the call center, and other general information. The call center software may also collect information about the call itself, such as caller ID information. This information may be used to route the call within the call center and may also be used to populate fields in the call center's customer relationship management (CRM) software program. For example, the call center software may request the caller to enter information about the preferred language, select an option associated with the purpose of the call, and optionally enter additional information such as an account number and password or secret code. Frequently, this results in a caller entering lots of information via the telephone keypad, which is relatively inconvenient for the caller. Indeed, some callers become frustrated by the process and simply hang up rather than proceeding through the process, thus resulting in a lack of a sales opportunity for the call center or a dissatisfied customer without the ability to obtain effective customer support.

In an on-line context, the circumstances are the same. Specifically, an on-line support desk will frequently require the user to fill in information about themselves prior to passing the information to an on-line sales or support agent. While this information may be supplied by the user's computer, this method is ineffective where the user has disabled the use of cookies, or where the computer is a shared computer and does not already contain the user's information.

SUMMARY OF THE DISCLOSURE

The present disclosure overcomes these and other drawbacks by providing a method and apparatus for interfacing a customer with a call center. According to an embodiment of the disclosure, a Radio Frequency Identification (RFID) tag is used to supply information about a customer to a call center to enable information about the customer to be provided in connection with a session with the call center. The call center may be accessed by telephone, computer, or via another type of customer premises equipment over a voice or data network. The RFID tag may be an identification tag provided to the customer for access to the call center or may be a tag associated with the customer and not specific to the call center. Information from the RFID tag may be used to route calls within the call center to enable the customer to be served by an agent in an appropriate skill set. The call center may route calls based on customer identity and previous sessions with that customer, information obtained from the RFID tag and statistical support records for other sessions involving customers with similar RFID information, and according to agent statistical support records. The call center may also route calls based on routing information contained in the RFID tag information. Various programming techniques, such as neural net, fuzzy logic, and Bayesian logic programming techniques, may be used to implement the routing decisions at the call center.

BRIEF DESCRIPTION OF THE DRAWINGS

Aspects of the present disclosure are pointed out with particularity in the appended claims. The present disclosure is illustrated by way of example in the following drawings in which like references indicate similar elements. The following drawings disclose various embodiments of the present disclosure for purposes of illustration only and are not intended to limit the scope of the disclosure. For purposes of clarity, not every component may be labeled in every figure. In the figures:

FIG. 5 is a flow diagram illustrating a process of interfacing a piece of customer premises equipment with a call center according to an embodiment of the disclosure.

DETAILED DESCRIPTION

The following detailed description sets forth numerous specific details to provide a thorough understanding of the disclosure. However, those skilled in the art will appreciate that the disclosure may be practiced without these specific details. In other instances, well-known methods, procedures, components, protocols, algorithms, and circuits have not been described in detail so as not to obscure the disclosure.

Figure 1:
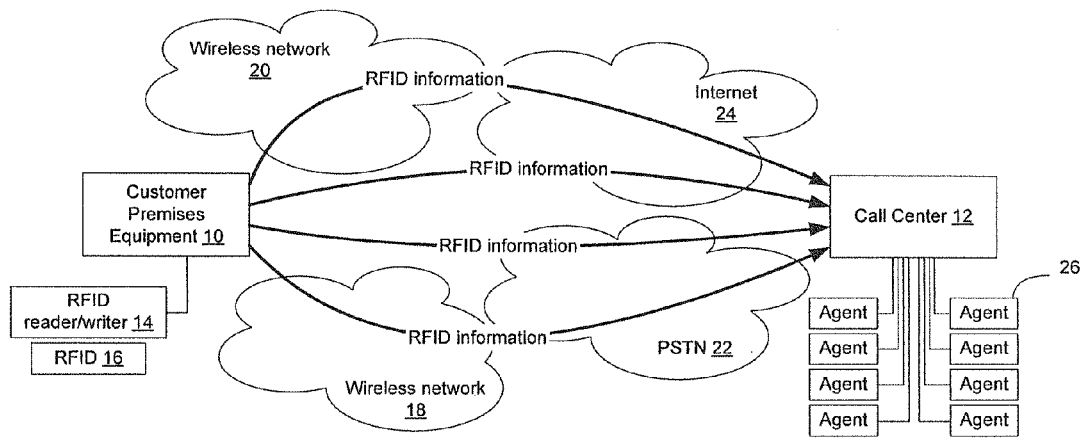
FIG. 1 is a functional block diagram of a piece of customer premises equipment interfacing a call center over a communication network according to an embodiment of the disclosure.

FIG. 1 illustrates an example of a network configured to interface a customer with a call center according to an embodiment of the disclosure. As illustrated in FIG. 1, a customer associated with customer premises equipment 10 may want to access a call center 12 to interact with the call center. Commonly, call centers are used to sell products or services to customers, provide support for products and services previously sold to customers, and for many other purposes. The disclosure is not limited to the particular type of call center to be accessed by the user or to the type of transaction to occur between the customer and the call center. As used herein, the term "customer" will be used to refer to a person, company, computer, or other entity that would like to interact with a call center. Thus, a "customer" is not limited to natural persons and is not limited to a person seeking to make a purchase or to a person that has previously made a purchase from the call center.

The customer premise equipment 10 may be a telephone, cellular telephone, a personal computer, a hand-held computing device such as a personal digital assistant, or another piece of equipment configured to enable a communication session to take place between the customer and a call center. As shown in FIG. 1, the customer premises equipment 10 includes a RFID reader 14 configured to read information from an RFID tag 16 associated with the customer. The RFID reader 14 may be internal to the customer premises equipment 10, attached to the customer premises equipment, or otherwise interfaced to the customer premises equipment.

Radio Frequency Identification (RFID) tags are electronic tags containing personal or general information and are starting to be used as a means of identification. For example, an RFID tag may be configured to hold the customer's personal information such as name, address, and phone number; account or financial information such as their account number with the company associated with the call center, other accounts with other companies, and credit card information; demographic information such as height, weight, and age; and other types of information. For example, a RFID tag may contain phone number information associated with the call center, or information associated with a personal agent at the call center. RFID tags are currently being used in connection with business cards, name tags at trade shows, and in other contexts to enable the holder of an RFID tag to be identified to others in the venue. The disclosure is not limited to a particular type of RFID tag as the disclosure may work with numerous types of RFID tags configured to store information in a variety of different ways.

RFID tags may be configured as read-only tags containing a statically programmed memory chip. Read-only chips may have information stored on them during the manufacturing process and the information on the chip may never be changed. Read-only chips are typically less expensive to manufacture since the memory technology is less expensive than programmable memory, and may be useful employed for example where the call center provides customers with an RFID tag. For example, where the RFID tag is incorporated into a bill or collection notice, the RFID tag may be pre-programmed during the manufacturing process and contain codes to enable the call to be routed to an appropriate area of the call center.

Read-write RFID tags contain reprogrammable memory that allows additional information to be added to the tag or existing information to be erased or replaced with new information. Read-write tags may include, for example, electrically erasable programmable read-only memory (EEPROM) or another type of memory. By providing the ability to modify the information stored on the RFID tag, the user may add personal information and other types of information to the RFID tag. Additionally, the call center may add information such as data or a small amount of executable code to the RFID tag when the user accesses the call center.

When the customer wishes to access the call center, the customer accesses the customer premises equipment 10 and instructs the customer premises equipment to interface with the call center 12. This may be done in a conventional manner by dialing a telephone number or causing the customer premises equipment to access a web site or other portal associated with the call center. Optionally, access to the call center may be performed automatically when the customer provides RFID information via the RFID reader, as discussed in greater detail below.

According to an embodiment of the disclosure, in connection with accessing the call center, the customer causes RFID information to be transmitted from its RFID tag 16 to the RFID reader 14, for example by placing the RFID tag within a particular distance of the RFID reader 14. This transfer of information may cause the call center access to occur, or optionally may be provided during the process of establishing a session or once access has occurred. Transmission of RFID information from the RFID tag to the RFID reader provides information associated with the customer to the customer premises equipment which may then be passed on to the call center 12 in native form or in a translated form, for example where the customer premises equipment contains software to parse the RFID data to extract information for use by the call center.

Transmission of RFID information to the customer premises equipment allows personal information, account information, demographic information, and other information associated with the customer to be provided in connection with a particular call to the call center. This allows information associated with the customer to be provided even where the customer is using customer premises equipment that does not contain its relevant information or contains another customer's relevant information. For example, if a customer borrows a telephone to access a call center, providing the relevant information from an RFID tag rather than from the telephone allows the information to be provided to the call center to be specific to the customer.

Once a session has been established with the call center, RFID information is passed from the customer premises equipment to the call center. Depending on the nature of the customer premises equipment and the manner in which the session has been established, this may involve the transmission of RFID information across one or more networks, such as wireless telephone network 18, wireless data network 20, the public switched telephone network 22, and the Internet 24. The disclosure is not limited by the particular manner in which a session is set up between the customer premises equipment and the call center, as many different ways of connecting parties have been developed and the disclosure is not specific to any one such way.

A call center 12 conventionally has a plurality of agents 26 configured to answer calls from customers or to engage on-line customers. Depending on the size and nature of the call center, different agents may have different specialties and may be grouped into different skill sets. For example, a telecommunications provider may provide telephone service, internet service, and cable television service. The call center for the telecommunications provider may divide its call center into three skill sets, one for each of these distinct types of services, and assign agents with particular training and experience to each of the skill sets or to combinations of skill sets. The disclosure is not limited to this particular example.

To optimize the efficiency of the call center, and to provide the customers with optimal customer service, a call center may attempt to route incoming sessions to an agent with the appropriate skill set. According to an embodiment of the disclosure, the RFID information, or information associated with the RFID information, is provided to the call center in connection with the session to enable the session to be routed within the call center. By providing RFID information to the call center, the incoming session may be routed more precisely without requiring the customer to input additional information manually. Optionally, the RFID information may be passed to the agent as well or to a computer system associated with the call center to enable information associated with the subscriber to be provided to the agent. One way in which the information may be provided to the agent is via a customer relationship management (CRM) software program available to the agent at the agent's station, although the disclosure is not limited in this manner.

Routing within the call center may be performed in a number of different ways. For example, assume that the RFID tag associated with the customer was provided to the customer for use in interactions with the call center. This may occur in many different ways. For example, an RFID tag may be provided with a product purchased by the customer, in a bill sent to the customer, in a collection notice, proxy notice, or other communication sent to the customer, or in an advertisement distributed to the customer. Numerous other circumstances exist as well and the disclosure is not limited to this illustrative group of described circumstances.

Where the RFID tag is provided by a company associated with the call center, the data in the RFID may be constructed to be usable by the call center directly. For example, assume that a call center sent out advertisements with RFID tags programmed one way, and also sent out collection notices having differently programmed RFID tags. When a call from a customer is received by the call center, and the RFID information associated with the call is provided, the call center may distinguish between the two tags to route calls associated with the advertisement RFID tag to the sales skill set and calls associated with the collection notice skill set to the collections skill set.

An RFID tag created to interface the call center may contain generic information, as described above, as well as information specific to the customer, such as the customer's account number, balance due, due date, payment history, and subscription usage information. The RFID tag may also include a customer support telephone number or Internet address to enable the RFID tag to be used to initiate a session with the call center. In this instance, since the company associated with the call center produced the RFID tag, information fields associated with the RFID tag may be received in an expected manner and used to route the call within the call center. Optionally, skill set information and/or agent information may also be included in the RFID tag to allow the RFID tag information to be used directly by the call center to route the incoming session to the proper skill set group and/or agent within that skill set group.

If the RFID tag has not been provided by the call center or a company affiliated with the call center, the call center will need to interpret the RFID data to use that data to route the incoming session within the call center. If the RFID data format is standardized, use of the knowledge of the RFID standard may enable the call center to interpret the data. If not, the RFID data may be interpreted by parsing the data to look for known fields, to allow the RFID information to be used to route the session within the call center.

Different aspects of the RFID data may be used to route sessions differently depending on the nature of the call center and the manner in which skill sets have been defined for the call center. For example, a call center associated with a music store may have skill sets split by musical taste, whereas a call center associated with a clothing store may have skill sets split according to type of clothing. RFID data may be used to attempt to route sessions from customers accordingly by applying logic to predictively determine, based on known information, what skill set is more likely to be effective in helping the customer associated with the session. For example, in a call center associated with a music business, younger customers may be routed to a modern music skill set agent, while older customers may be routed to a classical music skill set agent. Thus, the routing logic within the call center may contain generalizations about purchasing habits of likely customers to enable sessions to be routed to increase statistically the likelihood that a particular customer will be sent to an agent in an appropriate skill set.

The RFID reader may receive information from multiple RFID tags at the same time. For example, a given RFID reader may receive RFID information from the user's RFID and may also sense other environmental RFID tags associated with other users or other products in the room with the user.

Once a customer has been routed to an agent, the agent may cause RFID information to be returned to the customer, to enable additional RFID information to be stored on the RFID tag where the RFID tag is a read-write RFID tag. For example, the agent information and skill set information may be transmitted to the customer to enable subsequent interactions between the customer and call center to be handled by the same agent. Alternatively, the agent may cause a customer specific RFID tag to be generated to be provided to the customer for subsequent sessions.

Additionally, executable code may be downloaded to the RFID tag, for example an applet may be downloaded to the RFID tag, and this applet, when downloaded to the customer premises equipment or call center, may cause the consumer premises equipment or call center, to behave in a particular way when a call is made or when the tag is placed within a transmittal range of an RFID reader or at a scheduled time. Examples of downloadable code may include a call-back code that would allow the RFID tag to interact with an RFID interpreter on the telephone to provide the call center's number for use by the telephone, code that may be used to convey to the call center the number of minutes or call sessions that have been placed by the user using the RFID tag, or any number of additional actions. The disclosure is not limited to any particular type of information or executable code programmed into the RFID tag by the call center.

Executable code and data may be downloaded to the RFID tag automatically by the call center or through action of the agent. For example, the call center may download executable code automatically to be stored on the RFID tag to allow the applet to be uploaded to the customer premises equipment for the present interaction or for a subsequent interaction with the call center. Alternatively, the agent may cause the executable code to be downloaded during the session. Thus, for example, the agent may download code to the RFID for abusive customers to prevent the customers from having subsequent access to the call center or to cause those customers to be routed to an abusive customer skill set within the call center. Similarly, where a customer makes a purchase that exceeds a particular amount, the agent may reward the customer with a piece of software that may be used to obtain a future benefit, such as a discount or to enter the customer in a random drawing for a prize. Many other uses may be envisioned and the disclosure is not limited to these several described uses.

Figure 2:
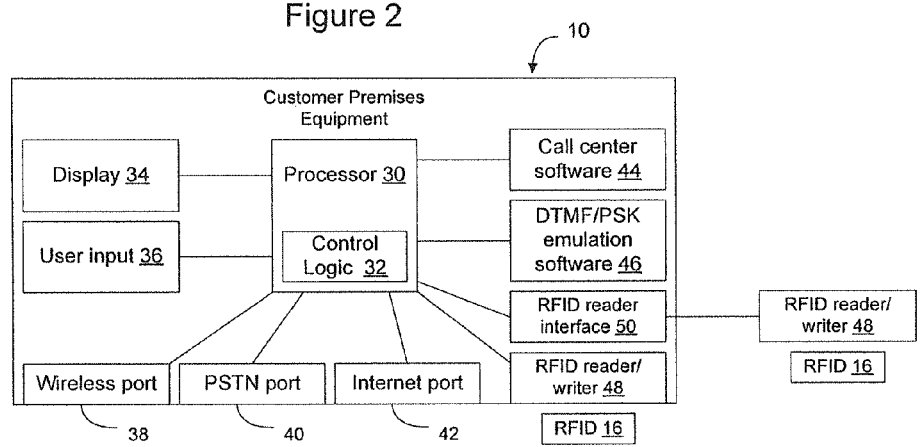
FIG. 2 is a functional block diagram of customer premises equipment including an RFID reader according to an embodiment of the disclosure.

FIG. 2 illustrates an example of customer premises equipment 10 according to an embodiment of the disclosure. As shown in FIG. 2, the customer premises equipment 10 includes a processor 30 including control logic 32 configured to enable it to process instructions to execute computer program code stored in memory on the customer premises equipment. The customer premises equipment may be optimized to perform a particular class of actions, like a telephone, or may be a general purpose computer configured to communicate over a public or private data network. The customer premises equipment may include features, such as a display 34 to present information to the customer and an user input 36 such as a keyboard, mouse, track ball, touch pad, keypad, stylus, or other user entry device.

The customer premises equipment 10 may include one or more ports configured to enable the customer premises equipment to communicate via one or more of the networks 18-24. For example, the customer premises equipment may include one or more wireless ports 38 to enable the customer premises equipment to communicate over the wireless telephone network or wireless data network, may include a telephone jack 40 to enable it to communicate over the public switched telephone network 22, and may include a data port such as an Ethernet port to enable it to engage in high speed sessions over the Internet 24. The disclosure is not limited to customer premises equipment having any particular types of ports as numerous types of ports may be used.

The customer premises equipment may also have one or more pieces of software loaded onto it to enable it to interact with the call center. For example, the customer premises equipment may include call center software 44 to enable it to interact with the call center to provide information from the RFID tag. For example, the call center may provide consumers with customer premises equipment software routines to optimize interactions between the call center and the customer premises equipment. For example, the call center may provide a software routine to collect and parse RFID information from the customer premises equipment 10 and transmit information over the network in a form more readily usable by the call center 12. One way in which this may be implemented is by transmitting an applet or cookie to the customer premises equipment, although the disclosure is not limited in this regard.

The executable code may also be stored on the RFID tag, as discussed in greater detail above. When executable code is stored on the RFID tag, the information, including the executable code, will be transmitted from the RFID tag to the customer premises equipment. The executable code may then be used by an interpreter or other code previously loaded onto the customer premises equipment to allow the customer premises equipment to be programmed in a particular manner to allow the RFID data or interaction with the call center to be handled in a desired fashion. Alternatively, the RFID data including the executable code may be transferred to the call center to cause the call center to operate in a particular way. Thus, for example, the call center may be configured to play a particular music selection to the user while waiting in a queue based on the executable code transferred from the RFID tag.

The RFID information contained on the RFID tag may contain information configured to allow access to the call center, such as authorization codes or access counter information to allow the holder of the RFID tag to access the call center particular number of times or to allow the RFID tag holder to obtain premium access to the call center for a particular number of sessions or particular amount of time. Premium access to the call center may thus be controlled and sold through the issuance of RFID tags, which would allow the customer to obtain access to premium support without requiring the customer to remember passwords, access codes, and other information that may not be readily available or easy to remember.

Additionally, where the call center to be accessed does not include the ability to receive RFID information, the customer premises equipment may include Dual Tone Multi-Frequency (DTMF) generator or Phase Shift Key (PSK) generator to generate DTMF/PSK information in response to prompts from the call center. In this embodiment, the customer premises equipment may receive RFID information, establish a call to the call center, receive prompts from the call center in the form of voice prompts, convert the voice prompts into machine codes, decode the machine codes to determine what piece of information is being requested by the call center, and generate codes to respond to the call center. For example, assume that a session is established and the RFID information provided by the customer indicates that the customer speaks English as a primary language. If the call center responds by stating "please press 1 for English, 2 for Spanish . . . " the customer premises equipment, using the RFID information, may automatically generate a DTMF "1" in response to the prompt. The disclosure is not limited to this embodiment as other embodiments may preferentially omit a DTMF emulation software module.

The customer premises equipment may include a native RFID reader 48 or an RFID reader interface 50 to an external RFID reader 52. The RFID readers 48, 52 may be configured to read information from RFID tags 16 in a known manner. The disclosure is not limited to the type of RFID reader used in connection with customer premises equipment 10 or to how the RFID reader is incorporated into or interfaced to the customer premises equipment 10.

Figure 3:
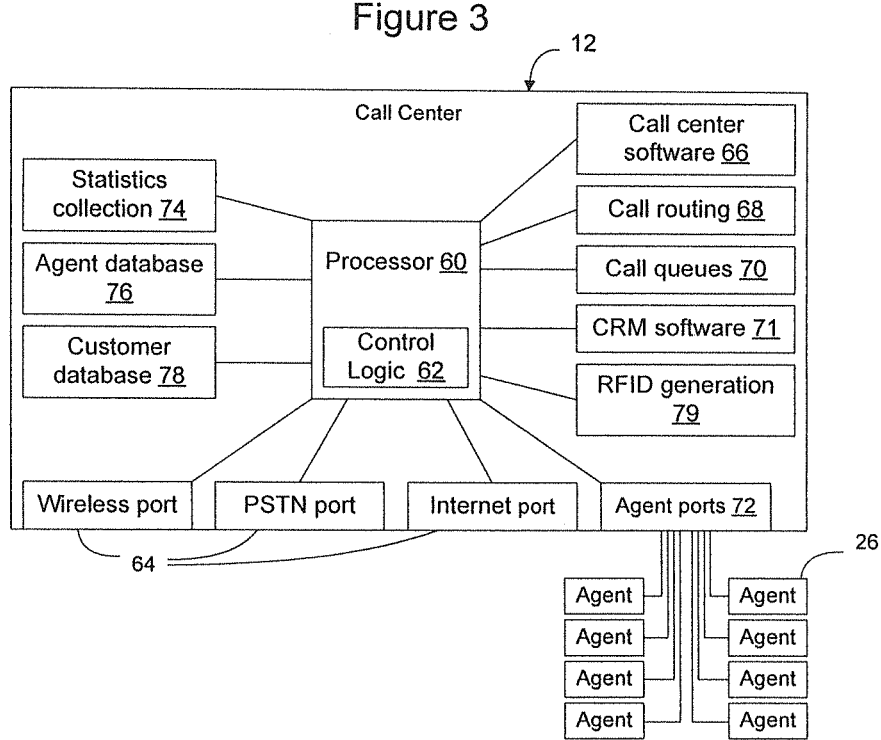
FIG. 3 is a functional block diagram of a call center network element according to an embodiment of the disclosure.

FIG. 3 illustrates an example of a call center network element according to an embodiment of the disclosure. As shown in FIG. 3, a network element at a call center generally includes a processor 60 containing control logic 62 configured to implement software routines to enable the network element to function as a call center 12. The call center also includes one or more ports 64 to enable the call center to be accessed over one or more of the networks 18-24 illustrated in FIG. 1.

The call center may include call center software 66 to enable the call center to interface with customers. The call center may also include routing software 68 configured to enable the call center to route sessions within the call center so that customers are directed to an appropriate agent. The call center may also include queues 70 to allow the sessions to be held pending the availability of an appropriate agent, and other conventional call center features. Optionally, customer relationship management (CRM) software 71 may be provided to store information about customers and allow the information to be presented to agents in connection with the call session.

Sessions are interfaced to agents 26 over agent ports 72. As discussed above, the agents may be grouped by skill set, demographic, or other groupings. The routing software 68 may use the provisioned division to route incoming sessions to the agents so that an agent having appropriate training or experience may be matched with an incoming session. As discussed herein, the routing logic may utilize information received or deduced from the RFID information to route the incoming session to an appropriate agent or group of agents in a particular skill set.

Routing within the call center may be implemented using soft computing configured to learn over time how to route incoming sessions. Examples of soft computing include neural networks, fuzzy logic, and Bayesian logic, although the disclosure is not limited to an implementation using one of these particular types of programming techniques. The statistical decision making may be performed on data in an unknown data set received from the RFID tag, based on environmental information associated with other RFID tags within range of the RFID tag reader, or may be based on known information from an RFID tag provided by the call center. The disclosure is not limited to the particular manner in which the software is programmed or trained to interpret RFID tag information.

The call center may have other features as well. For example, the call center may include a statistics collection module 74 configured to interface with an agent database 76 and customer database 78 to generate statistics about how particular agents or skill sets interface with particular types of customers. The statistics may be correlated with RFID information received in connection with the incoming sessions, and used by the soft computing technique to modify the routing software so that the manner in which sessions are routed may be modified over time according to statistical trends. For example, assume the call center is associated with a music store, and initially the call center routing software includes a rule configured to route callers over 50 years of age to a particular skill set and callers under 50 years of age to another skill set. Over time, it may emerge that the age division should be moved down or up depending on the sales records, overall customer satisfaction, number of calls transferred between skill sets, and other types of statistics. By correlating RFID information and how the sessions are handled, the routing software may be adjusted to route sessions within the call center more effectively.

The customer database allows statistics and records to be maintained for particular customers so that repeat customers may be handled by the call center more effectively. Thus, a particular customer that has previously interfaced the call center and successfully interfaced to a particular skill set may be routed to that same skill set for the new session. Similarly, the customer may be routed to the same agent, if that agent is available, if the customer was successfully routed to a particular agent in a previous session. Conversely, where the customer has had a bad experience with a particular agent, the customer may be routed such that the customer will not be served by that agent during subsequent calls. Thus, customers who are abusive may be flagged by the call center and routed to an abusive caller call set or transferred to an answering service without being forwarded to an agent.

The customer database may contain more information than simply a record of previous sessions, but may also be configured to contain inferred customer preferences based on previous sessions. Thus, for example, if a particular customer has terminated a session after being on hold for five minutes, the customer database may be amended to reflect that this customer is not likely to hold longer than five minutes and the routing software may use this information to seek an agent queue that is shorter than five minutes. Other customer preferences may be inferred as well. The customer database thus allows customer specific statistics to be used to route sessions from a particular customer.

The agent database may contain agent information such as statistical sales records or successful session information associated with that agent, which may be correlated with incoming session RFID information. Enabling the call center to build a database of information for the agents based on incoming RFID information allows the routing software to determine, based on the RFID information for a new session, which agents are likely to do well on the session and which agents are likely to not perform as well during the session. The session may be routed accordingly to preferentially select one of the agents that has performed well during previous sessions with customers that transmitted similar RFID information.

Optionally, the call center may include an RFID generation module 79 to enable the call center to be configured to generate RFID tag information. The RFID tag information may be used by an RFID tag programming apparatus to create RFID tags specific to the call center so that the RFID information supplied by customers in subsequent sessions may be used directly to route the call within the call center. Where the user has access to an RFID writer, the agent may pass the agent-generated RFID information to the customer during the session to allow the new information to be stored on the customer's RFID tag. The disclosure is not limited to a call center including this module, however, as this information may be obtained from the call center in another manner, such as via a management interface, and used to create RFID tags for use by the customers.

Figure 4:
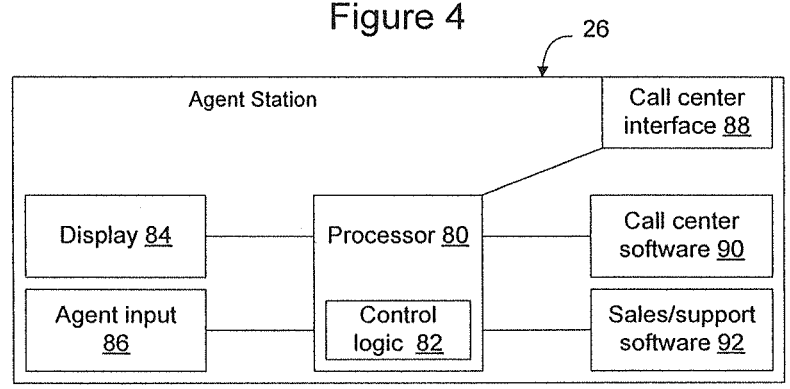
FIG. 4 is a functional block diagram of an agent terminal configured to be interfaced to the call center network element of FIG. 3 according to an embodiment of the disclosure.

FIG. 4 shows one example of an agent terminal that may be used to interface an agent to the call center. As shown in FIG. 4, the agent terminal includes a processor 80 containing control logic 82 configured to enable the agent terminal to run software to allow the agent to interact with customers via the agent terminal. The agent terminal may include a display 84 and an agent input 86 in a manner similar to the customer premises equipment discussed above. The agent terminal may also include a call center interface 88 to allow the agent terminal to be connected to the call center 12 discussed above in connection with FIG. 3.

The agent terminal also includes call center software 90 and sales/support software 92 such as customer relationship management (CRM) software to enable the agent terminal to provide the agent with information to enable the agent to provide technical support, engage in sales activities, or otherwise interact with customers on sessions. Agent terminals are well known in the art and the disclosure is not limited to a particular type of agent terminal or to particular software modules associated with the agent terminal.

FIG. 5 illustrates a process of interfacing a customer with a call center according to an embodiment of the disclosure. As shown in FIG. 5, when a customer interfaces a call center such as by initiating a session (100), RFID information associated with the customer is transmitted to the call center, either alone or in connection with additional information supplied by the customer (102).

The call center, upon receipt of the RFID information, analyzes the RFID information to determine if it is specific to the call center (104). This may be done, for example, by associating a particular data format with RFID information specific to the call center, by including a particular code for RFID tags containing information specific to the call center, or in another manner.

If the RFID information is specific to the call center, the format of the data will be known to the call center and the data may be used to route the call within the call center. Routing, in this instance, may take place directly (106) or by correlating RFID information with call center parameters (107) that may then be used to route the call (106). For example, the RFID data may contain a routing field or may contain fields that may be read by the call center to key into the particular skill sets to readily route the call within the call center. Alternatively, the RFID data may contain fields of information that may be used by the soft computing architecture to statistically route the call within the call center.

If the RFID information is not specific to the call center, the call center will need to interpret the RFID information to parse useable information from the RFID information. The parsed information will be correlated with call center parameters (108) to route the call within the call center based on the identifiable information (110). This may be done, as discussed above, using a soft computing technique to probabilistically or statistically route the call within the call center. Where the information associated with the RFID information is not able to be parsed, or not able to be correlated with information that is used by the call center to route calls, the customer may be prompted to enter data manually to enable the session to be routed or, alternatively, the session may be routed to a default skill set. Additionally, other information available to the call center from the telephone network, such as caller ID information, or domain name system (DNS) information such as Internet Protocol (IP) address, Uniform Resource Locator (URL) information, and other information available with the session, may be used to route the call within the call center as well.

Although the disclosure was described herein in connection with interfacing a customer with a call center, the disclosure may also allow identification of customers on a communication network as a supplement to caller ID or instead of caller ID. Thus, for example, the transmission of RFID information in connection with a telephone call may enable enhanced caller identification to be performed by network elements on the network configured to handle the call or by the customer premises equipment configured to complete the call. The use of RFID information may provide information about the person making the telephone call rather than the person to whom the telephone is registered, to thereby provide more accurate caller identification services on the network.

It should be understood that all functional statements made herein describing the functions to be performed by the methods of the disclosure may be performed by software programs implemented utilizing subroutines and other programming techniques known to those of ordinary skill in the art.

The software may be implemented as a set of program instructions configured to operate in control logic on a network element that are stored in a computer readable memory within the network element and executed on a microprocessor. However, it will be apparent to a skilled artisan that all logic described herein also can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present disclosure.

It should be understood that various changes and modifications of the embodiments shown in the drawings and described in the specification may be made within the spirit and scope of the present disclosure. Accordingly, it is intended that all matter contained in the above description and shown in the accompanying drawings be interpreted in an illustrative and not in a limiting sense. The disclosure is limited only as defined in the following claims and the equivalents thereto.

What is claimed is:

1. A method for effecting the presentation of information provided to an agent in a call center, the method comprising:
   receiving, at a call center network element configured to be communicatively coupled to a plurality of agent stations, Radio Frequency Identification (RFID) information from an RFID tag device via a wide area network (WAN), the RFID tag device generating the RFID information based on an RFID tag in reading proximity of the RFID tag device; and
   based on the RFID information, effect the presentation of information provided to one of the plurality of agent stations.

2. The method of claim 1, further comprising
   routing a communication session to the one of the plurality of agent stations based on the RFID information.

3. The method of claim 1, wherein the RFID tag device comprises an RFID tag reader and writer, and further comprising sending data to the RFID tag device via the WAN for recording on the RFID tag.

4. The method of claim 3, wherein the data comprises routing data for altering a routing of a subsequent communication session established with the call center network element.

* * * * *